April 8, 1947.  R. N. RIBLET  2,418,481

WHEEL

Filed July 2, 1945  4 Sheets-Sheet 1

ROYAL N. RIBLET
Inventor

Herbert E. Smith
Attorney

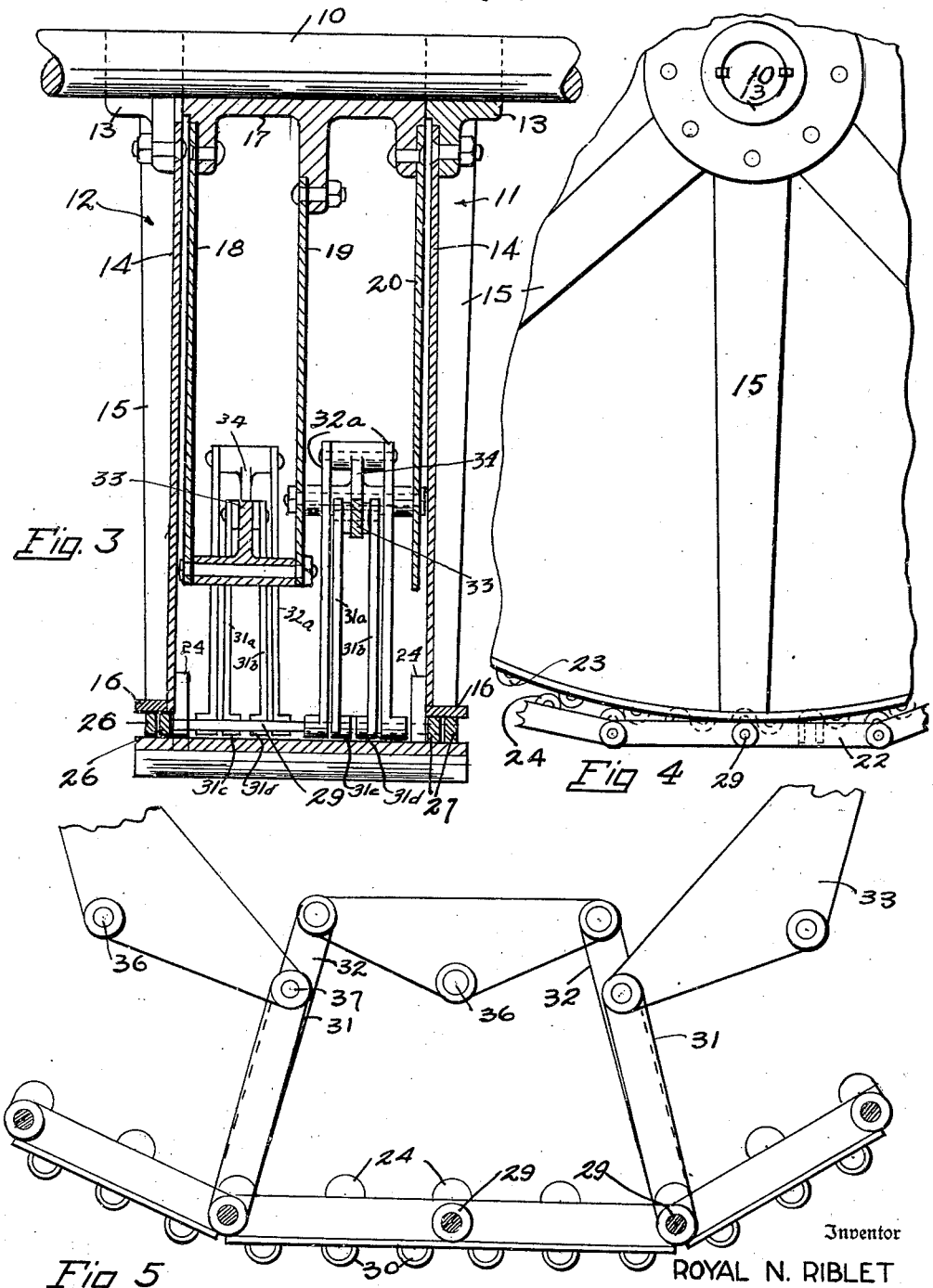

April 8, 1947.　　　R. N. RIBLET　　　2,418,481
WHEEL
Filed July 2, 1945　　　4 Sheets-Sheet 3
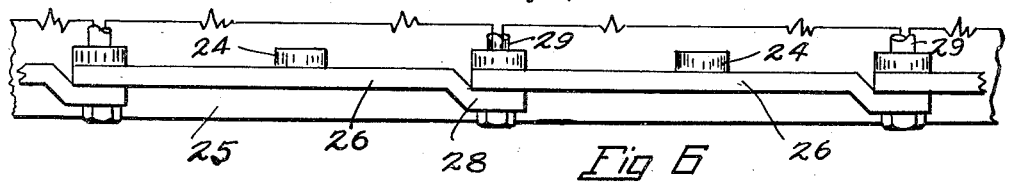
Fig 6
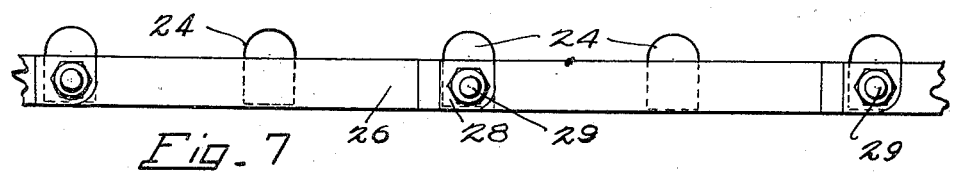
Fig. 7
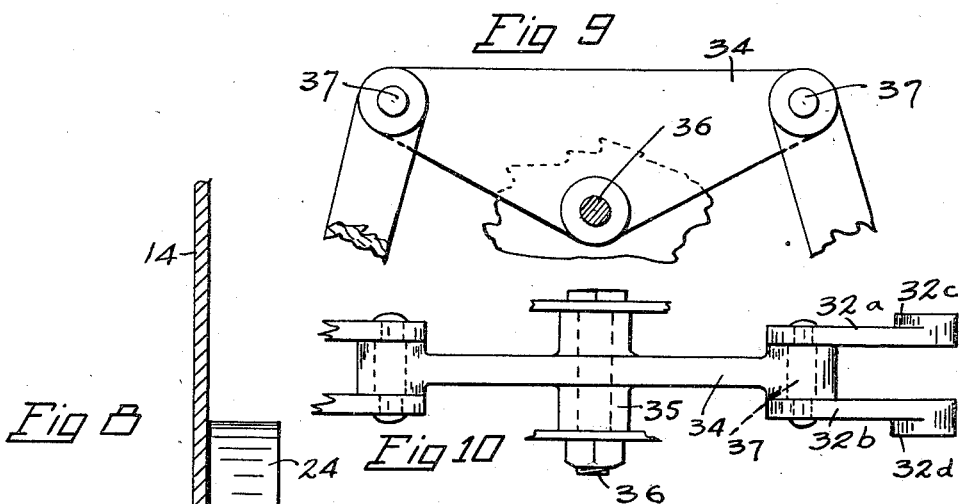
Fig 9
Fig 10
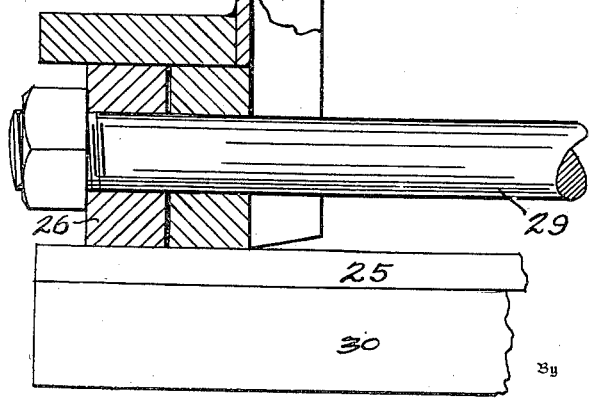
Fig 8
ROYAL N. RIBLET
Inventor
Herbert E. Smith
Attorney April 8, 1947.  R. N. RIBLET  2,418,481
WHEEL
Filed July 2, 1945  4 Sheets-Sheet 4

ROYAL N. RIBLET
Inventor

Herbert E. Smith
Attorney

Patented Apr. 8, 1947

2,418,481

UNITED STATES PATENT OFFICE 2,418,481

WHEEL

Royal N. Riblet, Spokane, Wash.

Application July 2, 1945, Serial No. 602,764

7 Claims. (Cl. 305—6)

My invention relates to an improved supporting and traction wheel of the type in which the wheel travels upon an endless, annular, linked tread that the wheel supports and positions in such a way that the load is always carried upon a flat surface of substantial length. The present invention is an improvement on the devices shown in my prior Patents 1,134,960 and 1,732,484.

It is a purpose of my invention to provide an improved construction in wheels of the type shown in my prior patents whereby the track laying elements of the wheels may operate with greater precision and more freedom from wear at the critical points than in the prior structures illustrated in my patents.

It is a further purpose of my invention to provide a new arrangement of traction links with the wheel rim and sprocket teeth upon both whereby correct engagement of the teeth is assured regardless of the type of terrain over which the vehicle is traveling. Loose sand, gravel, etc. cannot interfere with the engagement of the sprocket teeth and the wheel is self cleaning in mud or sand. In accordance with the present invention the number of sprocket teeth to be used in the wheel may be varied to suit different sizes of wheels and different conditions of operation by following certain critical limitations which I have discovered.

The nature and advantages of the invention will appear more fully from the following description, and the accompanying drawings wherein a preferred embodiment of the invention is shown. The description and drawings, however, are illustrative only, and should not be considered as limiting the scope of the invention except insofar as it is limited by the claims.

Figure 3 is an enlarged vertical sectional view on the line 3—3 of Figure 2.

Figure 4 is an enlarged fragmentary view in side elevation of a portion of the wheel.

Figure 5 is a fragmentary detailed view of part of the link and lever construction by which the tread links are positioned.

Figure 6 is a fragmentary detailed plan view of a portion of the tread illustrating how the treads are connected.

Figure 7 is a view looking upward at Figure 6 in the direction of the plane of the sheet, the tread surface being left off.

Figure 8 is an enlarged detailed sectional view through one side of the joint between tread links showing how the load is transmitted directly to the tread links.

Figures 9 and 10 are views illustrating details of the link and rocker construction.

Figure 1:
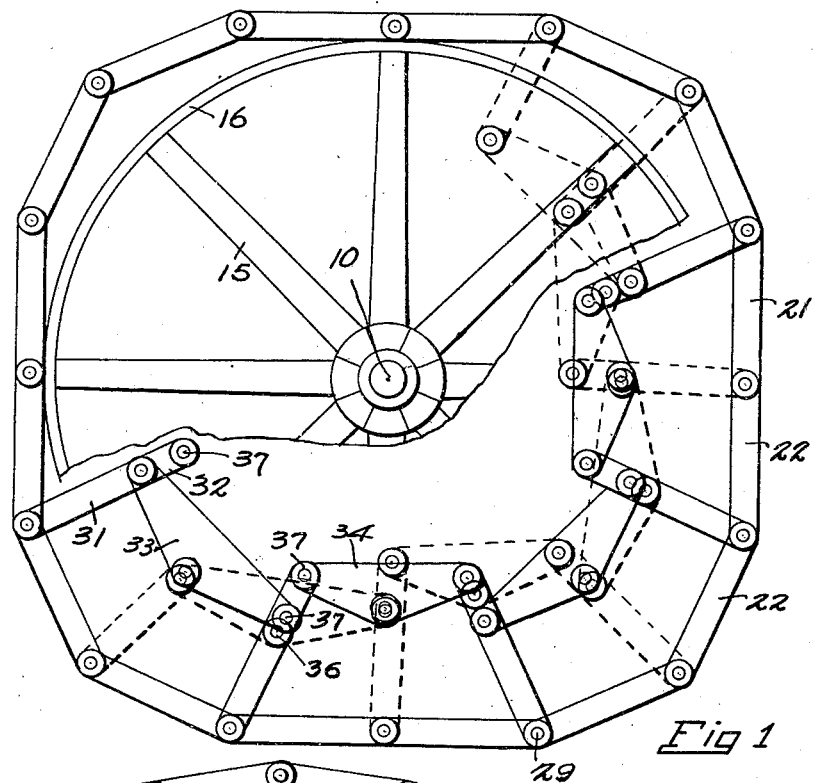
Figure 1 is a view in side elevation with parts broken away, of a wheel made in accordance with my invention.

In Figures 1 to 4 inclusive the general construction of my improved wheel is shown. A drive shaft 10 has two spaced wheel sections 11 and 12 fixed thereto. Each wheel section comprises a hub 13 keyed to the shaft, a disk 14 bolted to the hub 13, spokes 15 reenforcing the disk 14 and a rim 16 fixed, by welding or otherwise, to the periphery of the disk 14 and the outer ends of the spokes 15. Between the hubs 13 a hub 17 is mounted. This hub carries a plurality of rocker supports 18, 19 and 20. The supports 18, 19 and 20 are disk-like in form although functionally they furnish spokes to which rockers may be pivoted at properly spaced intervals about the shaft 10 as a center. The supports 18, 19 and 20 are not load bearing members so they need not be heavy. The wheels 11 and 12 provide means to guide an annular, linked tread 21 which is composed of sixteen like links 22. The rims 16 of the wheels ride on the links 22 and lateral shifting of the tread with respect to the wheels is prevented by sprocket teeth 23 and 24 on the wheels 11 and 12, and the tread respectively. The sprocket teeth preferably are welded in place. They are so constructed as to be semi-circular with the circle axis of the teeth 23 substantially in line with the periphery of the rim 16. This enables the teeth to clear themselves in sand and mud.

The construction of the tread links is shown best by Figures 6, 7 and 8. Each link 22 comprises a plate 25 and two rails 26 and 27, running lengthwise thereof. The rails have one end offset as at 28, so that the rail on the next adjacent link will overlap it. The rails project beyond the ends of the plates 25 and are drilled to receive hinge pins 29 for pivoting the links together. The links may be provided with traction lugs of any suitable type. As shown in Figure 5, transverse semi-cylindrical lugs 30 are provided.

The hinge pins 29 serve also to mount a set of short links 31 and a set of long links 32. There is a long link and a short link on each hinge pin 29. Long equalizer rockers 33 connect the alternate short links to each other. Short equalizer rockers 34 connect the alternate long links to each other. There are eight of the long rockers and eight of the short rockers. In order to provide ample bearings and to distribute the link bearings along the hinge pins I prefer to construct the rockers and links as shown, in Figures 3, 9 and 10 of the drawings. Each rocker has a wide middle bearing 35 which is mounted between two of the disks 18—19—20, by a bearing pin 36. Each long link 32 consists of two link sections 32a and 32b pivoted by a pin 37 to one end of a rocker. The outer ends of the link sections 32a and 32b have bearing portions 32c and 32d extended away from each other at their outer ends to receive the hinge pin 29. Each short link 31 consists of two link sections 31a and 31b and they have bearing portions 31c and 31d extended toward each other, to receive the hinge pin 29. The link sections are spaced apart properly to be arranged with the short link sections between the long link sections as shown by Figure 3. In order to avoid crowding of the rockers and links I mount four short rockers and four long rockers between the disks 18 and 19. The other four rockers of each size are mounted between the disks 19 and 20. I stagger the equalizing rockers and links so that each group has plenty of clearance. Figure 5 shows how the long and short rockers and links on one side of the disk 19 are spaced.

Figure 11:
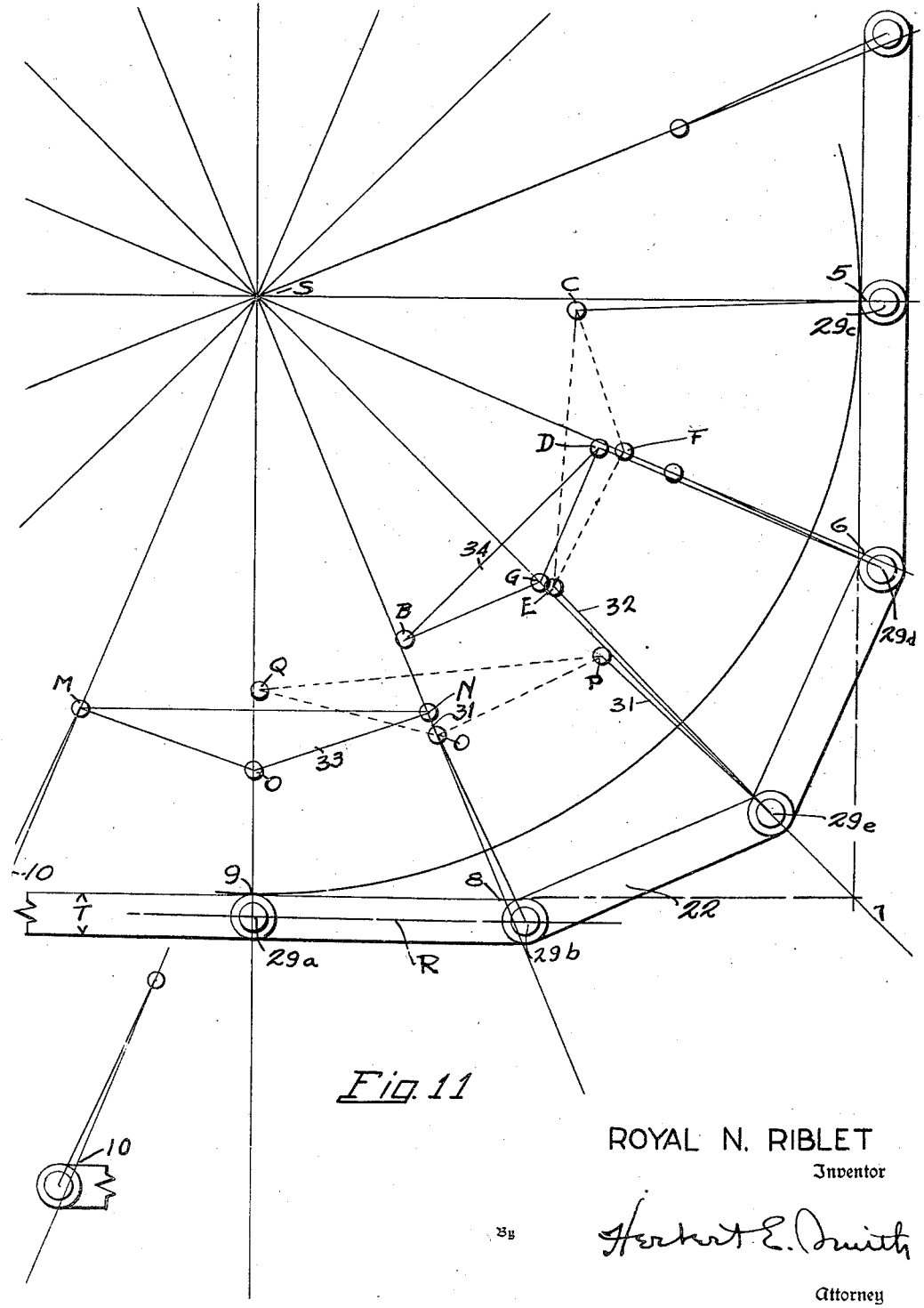
Figure 11 is a diagrammatic view illustrating the manner of laying out the various centers for the tread links and the rockers and links by which the tread links are manipulated as the wheel progresses.

In order to find the critical dimensions of a traction wheel of a desired diameter I proceed to make a drawing in the manner hereinafter described in connection with Figure 11.

Decide on the effective diameter of the wheel contemplated.

Draw a square with the sides equal to the radius of the wheel contemplated. The square is bounded by lines S5—5—7—7—9 and S9.

From one corner, preferably the upper left hand corner, draw the diagonal S—7.

Bisect the two angles made with this diagonal, with S—6 and S—8, using the upper left hand corner as the apex of each triangle, and also as the center of the wheel contemplated, with this center being designated by S.

With S as a center, describe a circle using S—5 as a radius.

Determine by calculation the size of the material required for the side rails of the treads. The estimated width of the side rail is indicated by T.

As the figure already drawn represents one quarter of a circle, or one quarter of the contemplated wheel, it is evident that a complete circle would be divided into 16 equal parts of 22½ degrees each, and chords connecting the intersecting points of the radii with the perimeter of the circle would create 16 identical triangles, each with their apex at the center of the circle S.

From the lower end of what would be the vertical radius S—9 of the circle, draw a line tangent to the circle until it projects beyond S—8.

This line 8—9 is now the pitch line of the teeth to be placed in the treads.

The pitch diameter of the sprocket wheels 11 and 12 being two times S—9, the circumference would be two times S—9 times 3.1416. As the sprocket wheel engages the tread in four places at all times, and at 90 degree spacing, it is evident that 3.1416 times 2 S—9 must be exactly divisible by four, and that the number of teeth in this wheel must be a multiple of four.

As the perimeter of the 16 treads is greater than the circumference of the wheels 11 and 12, and the teeth in one must mesh into the teeth of the other, the pitch of both must be the same.

However, the pitch in the treads must also be divisible by four, and as the periphery of the treads is greater than the circumference of the wheels, it is also evident that there must be more teeth in the combined treads than in the wheels, by an even multiple of four.

As the number 28 is the smallest number divisible by four, that can be increased by an even multiple of four, and have that product divided into four even numbers, that can be evenly divided by four, it is evident that if there were 28 teeth in the wheel, there would have to be 32 teeth in the combined 16 treads, or 8 teeth in each quarter of the perimeter, or two teeth in each tread. Or, if there were 40 teeth in the wheel and 2 (even) ×4, or 8 more in the treads, there would be 12 teeth in one quarter of the 16 treads or 3 teeth in each tread.

Summarily, only the numbers 28 and 40, or even multiples of 28 or 40 can fill these requirements. Therefore the circumference of the sprocket wheels 11 and 12, divided by either 28—or 40—or an even multiple of these numbers, will give the pitch of teeth in the wheels.

Also, if the pitch be multiplied by 32 the result will be the length of the perimeter of 16 treads, and this divided by 16 treads will give the number of teeth and the pitch in each of the treads as well as the length of each tread between end hole centers.

By taking ½ of T and drawing a line R parallel to 8—9 through the treads 22 the centers of the end holes will be in this line, and the distance between centers of the end holes will be the pitch multiplied by 2. The centers are designated 29a and 29b.

Now at point 5, follow the same diagram procedure as was done at point 8, and these bearing centers will be indicated by 29c and 29d.

Now with 29a and 29b as a radius, and with 29b and 29d as centers, describe arcs that will intersect radii S7. These arcs will intersect with S7 at a common point 29e, and will be the bearing ends of two more treads 22.

The approximate length of the active links in the wheel are determined by a compromise of either long links and short equalizer rockers, or short links and long equalizer rockers. The compromise makes the length of the short link approximately one-fifth the diameter of the sprocket wheel.

With this length as a basis, the exact lengths of the short and long links, and the exact length and design of the long and short equalizer rockers are determined. It is evident at this stage of the design that two lengths of links, the shorter one being inside the longer one, provides for increased bearing area in the links as well as in the equalizer rockers.

Referring to the diagram 31 represents the short link, 32 the long link, 33 the long equalizer rocker and 34 the short equalizer rocker.

It is evident now that any arrangement of parts that can be and is shown, in any 90 degree segment of the wheel or circle, can be, and is, duplicated exactly in the remaining three 90 degree segments.

The short link 31 has one end pivoted or hinged to the tread links 22, while the opposite end of the link 31 is hinged to one end of the long equalizer rocker 33, and one end of the long link 32 is hinged to the tread links 22 and the opposite end of link 32 is hinged to one end of the short equalizer rocker 34.

The relationship of the centers of the bearings in the ends of the equalizers, to the location of the bearings in the middle of the equalizers, is determined as follows.

Connect the points M—N where the inner ends of two alternate short links meet the radii S—8 and S—10. With this distance as a radius, and the inner end of a short link on S—9 as a center describe an arc intersecting an arc about point 29e which has the length of a short link 31 as a radius, then with the inner end of a short link 31 on S—7 as a center and the same distance M—N used before as a radius, describe an arc intersecting an arc about point 29a with a radius equal to the length of a short link 31. These intersections are indicated as P and Q. It will be found that the line PQ is the same length as line M—N. Now bisect the line PQ with a perpendicular that will intersect S—8.

The point O where the perpendicular line bisecting PQ meets the line S—8 is the center of the middle bearing in the long equalizer 33 and all the eight long equalizers in a completed wheel are identical with the triangle formed by P—Q—O. The bearing pins 36 for the long rockers are pivoted in the disks on the centers O at equal distances apart around the disks.

With the long spoke 32 as a radius and 29a—29d—29e and 29c as individual centers, describe arcs intersecting the radii from the center S to the individual centers at the points B, D, E and C, respectively. Join BD and CE.

Bisect C—E and erect a perpendicular until it intersects at F.

Connect C—F also E—F.

Now the triangle formed by E—F—C gives the center of the bearing in the short equalizers 34 in the completed wheel and the radius would be S—F.

With the perpendicular from F to the line C—E as a measure from the line B—D along S—7 locate the point G where the equalizer B—D—G is pivoted to the disks.

Now the location of the center of the bearings in the main spokes or discs (of which there are 3 discs, simulating 24 spokes) in a completed wheel, for the middle bearings of the short equalizer, will be on the circle about S through the points F and G, radius S—F or S—G, and all the radii are spaced by an arc of 22½ degrees.

Figure 2:
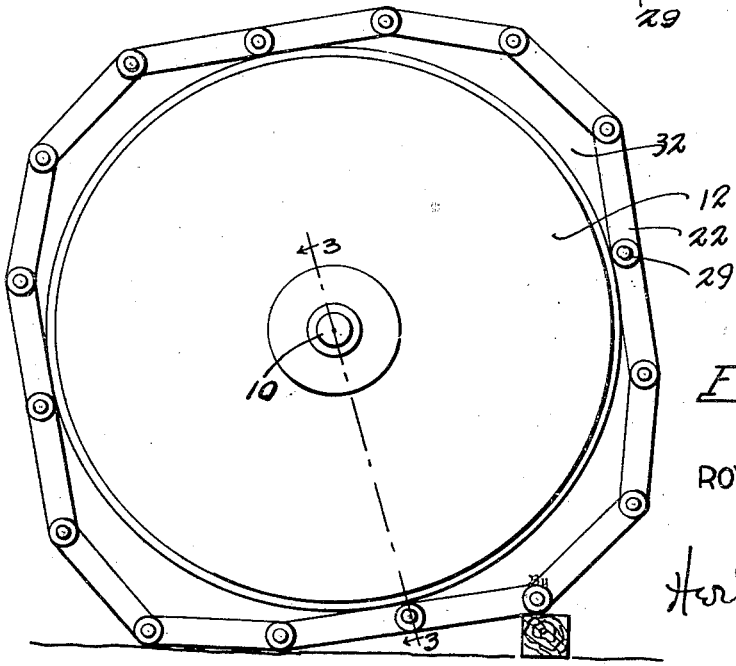
Figure 2 is a view in side elevation of the wheel showing how the wheel provides its own inclined ramp to climb over an obstruction.

In Figure 2 of the drawings I have illustrated how the wheel of my invention lays an incline for itself to climb over an obstruction. It is believed to be evident that there is a great mechanical advantage in this instance over an ordinary wheel climbing over the same obstruction. In all situations this device has the advantage of providing a flat track equal in length to two of the tread links. Any foreign material getting into the wheel does not interfere because the bearing rails 26 and 27 are raised above the tread surface. Also the shape of the teeth and their position at one side of the rails and the rim 16 cooperate to prevent foreign material from interfering.

When the wheel rests upon the ground the wheel members 11 and 12 will tend to settle and consequently they will force the pins 29 into position to bring the two bottom treads toward a straight line. The links and equalizer rockers cause all of the treads to assume the positions illustrated in Figures 1 and 2. Since the long and short links and their associated rockers are alternated with alternate rockers of each size on the opposite sides of the disk 19 the links extend substantially radially of the wheels in all positions. There is very little angular movement of the links about the pins 29 so that the wear is reduced to a minimum on the pins.

Having thus fully described my invention which I claim as new and desire to secure by Letters Patent is:

1. In a wheel, the combination with a shaft, a load bearing wheel centered on the shaft, a disk also centered on the shaft, an annular flexible, traction linked tread surrounding the load bearing wheel and having a bearing surface thereon upon which the load bearing wheel rolls, pairs of links pivoted to the pivotal connections of the several links of the tread, said pairs consisting of a long link and a short link, extending from the pivotal connection of the tread links substantially radially toward said shaft, and rocker arms centrally pivoted to the disk and having their ends pivoted to alternate links of equal length circumferentially of the wheel for aligning and flexing alternate pairs of link members of the tread.

2. In a traction wheel, the combination with a driving shaft, a pair of spaced sprockets fixed on the shaft and rim teeth on the sprockets, of a plurality of axially spaced annular rocker supports rotatable on the shaft, an annular flexible traction linked tread having teeth for engagement with the teeth of the sprockets, rockers pivoted on the supports, links connecting the rockers and linked treads for aligning and flexing alternate pairs of tread members of the tread, the length of each tread link being an even multiple of the center to center distance along the pitch line between teeth on the sprocket.

3. In a traction wheel, the combination with a driving shaft, a pair of spaced sprockets fixed on the shaft and semicircular rim teeth on the sprockets, of a plurality of axially spaced annular rocker supports, rotatable on the shaft, an annular flexible traction linked tread having semicircular teeth for engagement with the teeth of the sprockets, rockers pivoted on the supports, links connecting the rockers and linked treads for aligning and flexing alternate pairs of tread members of the tread, the length of each tread link being an even multiple of the center to center distance along the pitch line between teeth on the sprocket.

4. In a traction wheel, the combination with a driving shaft, a pair of spaced sprockets fixed on the shaft and rim teeth on the sprockets, of a plurality of axially spaced annular rocker supports rotatable on the shaft, an annular flexible traction linked tread having teeth for engagement with the teeth of the sprockets, rockers pivoted on the supports, links connecting the rockers and linked treads for aligning and flexing alternate pairs of tread members of the tread, said rockers and links comprising alternate long and short rockers in one group with short and long links connecting them to alternate joints in the treads and like rockers and links in another group axially offset from the first group and connected to the intermediate joints of the tread.

5. In a traction wheel, the combination with a driving shaft, a pair of spaced sprockets fixed on the shaft and semicircular rim teeth on the sprockets, of a plurality of axially spaced annular rocker supports, rotatable on the shaft, an annular flexible traction linked tread having semicircular teeth for engagement with the teeth of the sprockets, rockers pivoted on the supports, links connecting the rockers and linked treads for aligning and flexing alternate pairs of tread members of the tread.

6. In a traction wheel, the combination with a driving shaft, a pair of spaced sprockets fixed on the shaft and semicircular rim teeth on the sprockets, of a plurality of axially spaced annular rocker supports, rotatable on the shaft, an annular flexible traction linked tread having semicircular teeth for engagement with the teeth of the sprockets, rockers pivoted on the supports, links connecting the rockers and linked treads for aligning and flexing alternate pairs of tread members of the tread, said rockers and links comprising alternate long and short rockers in one group with short and long links connecting them to alternate joints in the treads and like rockers and links in another group axially offset from the first group and connected to the intermediate joints of the tread.

7. In a traction wheel, the combination with a driving shaft, a pair of spaced sprockets fixed on the shaft and rim teeth on the sprockets, rocker support means, an annular flexible traction linked tread having teeth for engagement with with the teeth of the sprockets, rockers pivoted on the support means, links connecting the rockers and linked treads for aligning and flexing alternate pairs of tread members of the tread, said rockers and links comprising alternate long and short rockers in one group with short and long links connecting them to alternate joints in the treads and like rockers and links in another group axially offset from the first group and connected to the intermediate joints of the tread.

ROYAL N. RIBLET.

REFERENCES CITED

The following references are of record in the file of this patent:

UNITED STATES PATENTS

| Number | Name | Date |
|---|---|---|
| 1,134,960 | Riblet | Apr. 6, 1915 |
| 1,732,484 | Riblet | Oct. 22, 1929 |